US011891276B2

(12) United States Patent
Wang et al.

(10) Patent No.: US 11,891,276 B2
(45) Date of Patent: Feb. 6, 2024

(54) SAFETY DEVICE FOR ELEVATOR SYSTEM AND ELEVATOR SYSTEM

(71) Applicant: Otis Elevator Company, Farmington, CT (US)

(72) Inventors: Wei Wang, Shanghai (CN); Fujun Yang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/726,239

(22) Filed: Apr. 21, 2022

(65) Prior Publication Data

US 2022/0396454 A1 Dec. 15, 2022

(51) Int. Cl.
*B66B 5/24* (2006.01)
*B66B 5/04* (2006.01)

(52) U.S. Cl.
CPC . *B66B 5/24* (2013.01); *B66B 5/04* (2013.01)

(58) Field of Classification Search
CPC .................................... B66B 5/24; B66B 5/04
See application file for complete search history.

(56) References Cited

U.S. PATENT DOCUMENTS 3,907,255 A * 9/1975 McElroy .................. B66D 1/54 188/188
9,272,881 B2 * 3/2016 Zhu ........................... B66B 5/16
10,519,005 B2 * 12/2019 Rivero .................... B66B 5/044
2020/0216289 A1 * 7/2020 Legua Garcia ........... B66B 7/06

FOREIGN PATENT DOCUMENTS

CN 107867616 A * 4/2018 ............... B66B 5/24
GB 217948 A * 1/1923
JP S5011250 U 2/1975
JP S51108324 U 8/1976
JP S5590682 U 6/1980
WO WO-2004085303 A1 * 10/2004 ............. B66B 5/185
WO WO-2013143425 A1 * 10/2013 ............... B66B 5/24

OTHER PUBLICATIONS

European Search Report for application EP 22178484, dated Nov. 9, 2022, 44 pages.

* cited by examiner

*Primary Examiner* — Diem M Tran
(74) *Attorney, Agent, or Firm* — CANTOR COLBURN LLP

(57) ABSTRACT

A safety device for an elevator system, and an elevator system. The elevator system includes a guide rope arranged in a hoistway to be used as a guide rail and a running device running along the guide rope, and the safety device includes a body which is connected to the running device, and a first component and a second component which are provided on the body and define a passage for the guide rope to pass through freely when the running device is in normal operation, the first and second components are configured for clamping the guide rope in the passage when a running speed of the running device exceeds a threshold, to restrict the speed of the running device or stop the running device.

11 Claims, 4 Drawing Sheets

SAFETY DEVICE FOR ELEVATOR SYSTEM AND ELEVATOR SYSTEM

FOREIGN PRIORITY

This application claims priority to Chinese Patent Application No. 202110647266.5, filed Jun. 10, 2021, and all the benefits accruing therefrom under 35 U.S.C. § 119, the contents of which in its entirety are herein incorporated by reference.

FIELD OF THE INVENTION

The present invention relates to the technical field of electromechanical equipment, and in particular to a safety device for an elevator system, and an elevator system.

BACKGROUND OF THE INVENTION

In many building places such as business office, production and manufacture, residential building, especially in many high-rise buildings, various types of elevator systems have been widely installed to convey passengers, goods, pets, etc. and a great convenience has been achieved thereby.

For these existing elevator systems, an elevator car and a counterweight are usually arranged in a hoistway, and rigid guide rails are also installed in the hoistway. Most of these guide rails are made of metal materials such as steel, aluminum alloy and constructed into a T shape. When a user operates the elevator, the elevator car and the counterweight will move up and down in the hoistway, so that the passengers, goods, pets, etc. can be conveyed to the destination by the elevator car. In the case that overspeed occurs to the elevator car or the counterweight, the correspondingly configured safety devices in the elevator system will be used to limit the speed of the elevator car or the counterweight so as to ensure the system safety. Such existing safety devices are designed to match the T-shaped rigid guide rails commonly used in elevator system, which can play the role of safety security.

SUMMARY OF THE INVENTION

In view of the foregoing, the present invention provides a safety device for an elevator system and an elevator system, thereby solving or at least alleviating one or more of the above-mentioned problems and other problems in the prior art, or provide an alternative technical solution to the prior art.

First, according to one aspect of the present invention, a safety device for an elevator system is provided. The elevator system comprises a guide rope arranged in a hoistway to be used as a guide rail and a running device running along the guide rope, and the safety device comprises: a body, which is connected to the running device; and a first component and a second component which are provided on the body and define a passage for the guide rope to pass through freely when the running device is in normal operation, the first and second components are configured for clamping the guide rope in the passage when a running speed of the running device exceeds a threshold, to restrict the speed of the running device or stop the running device.

In the safety device for the elevator system according to the present invention, optionally, the first and second components are arranged opposite to each other to define the passage, and when the running speed of the running device exceeds the threshold, a relative movement between the first and second components occurs so that the internal gap distance of the passage becomes smaller, until the first and second components contact the guide rope and clamp it in the passage.

In the safety device for the elevator system according to the present invention, optionally, when the running device is in normal operation, the first component is partially arranged upstream of the second component in the running direction of the running device, and the first and second components have an overlapping length in the running direction, the overlapping length being not less than half of the length of the second component.

In the safety device for the elevator system according to the present invention, optionally, when the running speed of the running device exceeds the threshold, the second component moves upstream relative to the first component in the running direction of the running device, and when the running device stops, the overlapping length of the first and second components in the running direction is substantially equal to the length of the second component.

In the safety device for the elevator system according to the present invention, optionally, the body is provided with a guide groove inclined with respect to the running direction, and the safety device comprises an actuating component which is connected to the second component and actuates the second component to travel along the guide groove to generate the relative movement with the first component when the running speed of the running device exceeds the threshold.

In the safety device for the elevator system according to the present invention, optionally, the corresponding portions of the first component and/or the second component defining the passage are configured to have a non-planar profile.

In the safety device for the elevator system according to the present invention, optionally, the non-planar profile includes a circular arc profile, a diamond profile or a square profile, and/or the non-planar profile has an undercut section with an undercut angle range of 30°-105°.

In the safety device for the elevator system according to the present invention, optionally, the corresponding portions of the first and second components defining the passage respectively, are configured to have structures symmetrical to each other.

In the safety device for the elevator system according to the present invention, optionally, the top and bottom ends of the guide rope are connected to the top wall and the bottom pit of the hoistway through a first terminating device and a second terminating device respectively, at least one of the first and second terminating devices is configured to adjust the tension of the guide rope.

In the safety device for the elevator system according to the present invention, optionally, the running device is an elevator car and/or a counterweight, and/or the running direction of the running device is the vertical direction of the hoistway or the inclination angle of the running direction of the running device relative to the vertical direction is less than 15°.

In the safety device for the elevator system according to the present invention, optionally, the guide rope is a steel wire rope or a carbon fiber rope, and/or the diameter of the guide rope is in the range of 10 mm-30 mm.

Secondly, according to another aspect of the present invention, an elevator system is also provided, which comprises: a hoistway; a guide rope, which is arranged in the hoistway to be used as a guide rail; a running device, which is arranged in the hoistway and runs along the guide rope; and at least one safety device for elevator system according to any of the above described, which is arranged to be connected to the running device.

As compared with the prior art, the safety device provided by the present invention can work with a guide rope in a new type elevator system so that it is able to prevent accidents by providing safety security function timely, efficiently and reliably when an elevator car or a counterweight is running overspeed. The invention has compact structure, reliable working performance, and is easy in manufacture, installation and maintenance. It can effectively enhance safety performance of an elevator system which may use various guide ropes as running guide rails.

BRIEF DESCRIPTION OF THE DRAWINGS

The technical solutions of the present invention will be further described in detail below with reference to the accompanying drawings and embodiments. However, it should be understood that these drawings are designed merely for the purposes of explanation and only intended to conceptually illustrate the structural configurations described herein, and are not necessarily to be drawn to scale.

DETAILED DESCRIPTION OF THE EMBODIMENT(S) OF THE INVENTION

Firstly, it should be noted that the structure, components, characteristics, advantages and the like of the safety device for elevator system and the elevator system according to the invention will be described below by way of example. However, it should be understood that neither of the descriptions should be understood as limiting the invention in any way.

Herein, technical terms "first", "second" are used for distinguishing expression only, instead of indicating their order and relative importance. The technical term "component" is intended to cover any possible forms of the structural construction, composition, etc., for example, it may consist of single or multiple parts. The technical term "substantially" is intended to include non-substantial errors associated with the measurement of a specific measure, for example, it may include a set value and the range of the set value ±8%, ±5% or ±2%, etc. In addition, for any single technical feature described or implied in the embodiments mentioned herein, or any single technical feature shown or implied in individual drawings, the present invention still allows for any further combination or deletion among these technical features (or equivalents thereof) without any technical obstacle. Therefore, it should be considered that more embodiments according to the invention should also fall within the scope recorded in this document. In addition, general matters what were already known to those skilled in the art will not be repeated herein.

Figure 1:
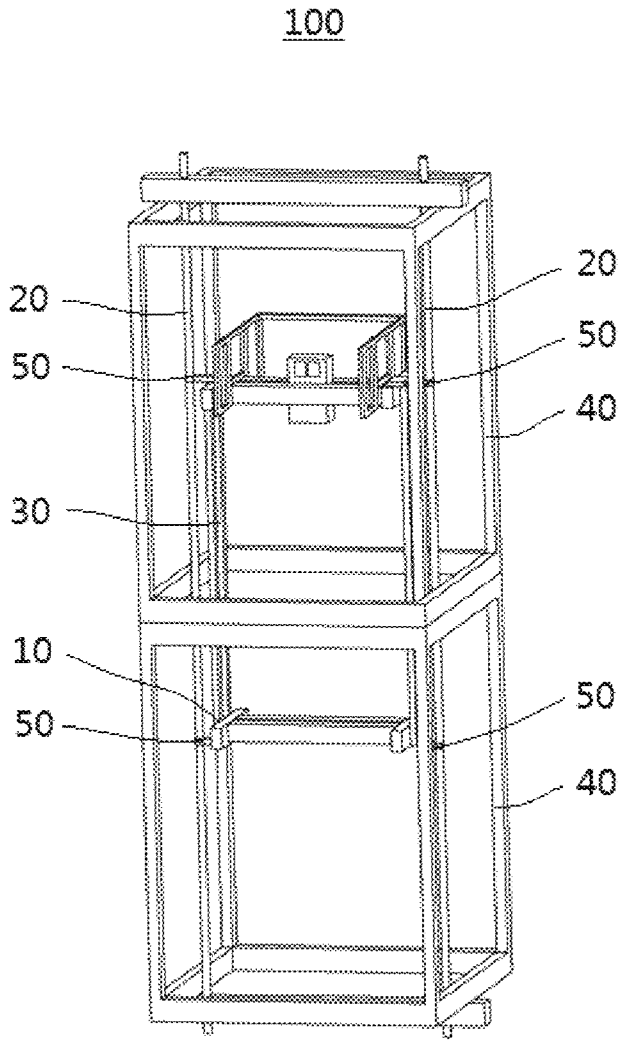
FIG. 1 is a structural schematic view of an embodiment of an elevator system according to the present invention.

FIG. 1 shows an embodiment of the elevator system of the present invention, in which the safety device of the present invention has been installed on the car frame of the elevator system. The solution of the present invention will be described in detail below by way of this embodiment.

As shown in FIG. 1, the elevator system 100 is provided to convey the carried objects such as passengers, goods, pets, etc. to corresponding destinations between different floors of a building place. The elevator system 100 may include a guide rope 20 arranged in the hoistway 40, a running device 30 (such as elevator car, a counterweight) running in the hoistway 40 along the guide rope 20, and a safety device 10. As an optional embodiment, the hoistway 40 may adopt a modular design, so that the hoistway of elevator system may be built and formed from a suitable number of hoistway modules conveniently, quickly and efficiently. In FIG. 1, it shows an elevator car as the running device 30, on the car frame of which a guide shoe 50 may be installed, and the guide rope 20 passes through the guide shoe 50, so that the elevator car may be allowed to move up and down along the guide rope 20.

Different from traditional elevator systems, in the solution of the present invention, the guide rope 20 is used to replace T-shaped guide rails which are commonly used in the traditional elevator systems. Since the height of the elevator hoistway is generally very high, these T-shaped guide rails have to be assembled and connected together in sections to form an entire guide rail during installation. In contrast, the tensioned guide rope 20 may be conveniently and quickly arranged from the top end to the bottom pit of the hoistway 40 in the running direction of the running device 30. At this time, the guide rope 20 will have sufficient tension and rigidity to provide the required rigidity and the like when it guides the running device 30 to move up and down along the guide rope 20, so as to ensure the running of the running device 30. By adopting the above inventive methods, it can significantly shorten the installation period of the equipment, and may save the installation workload and considerable costs of traditional guide rail brackets.

In practical applications, the guide rope 20 may adopt any suitable rope material such as steel wire rope, carbon fiber rope. For example, the rope material that is the same or similar to the hoist rope of elevator system may be adopted, so as to provide the performance (such as strength, toughness, wear resistance, tensile property, corrosion resistance) that meets the application requirements. In addition, it is allowable to flexibly select the diameter, cross-sectional shape, strand structure, processing method and other aspects of the guide rope 20 according to actual application requirements. For example, in some embodiments, a guide rope with a diameter ranging from 10 mm to 30 mm, such as 15 mm, 20 mm, 25 mm, may be selected. Of course, according to the present invention, it is also allows the use of guide ropes with other diameters in some applicable situations, for example, guide ropes with a diameter greater than 30 mm.

In addition, as an optional situation, the top end of the guide rope 20 may be connected to the top wall of the hoistway 40 through a first terminating device, and the bottom end of the guide rope 20 may be connected to the bottom pit of the hoistway 40 through a second terminating device. At least one of the above-mentioned two terminating devices can be set to adjust the tension of the guide rope 20, so that the tension adjustment operation of the guide rope 20 may be conducted as required, so as to avoid the situation that the guide rope may gradually grow longer and looser, e.g., after being used for a period of time. As an exemplary explanation, the above mentioned terminating device may adopt any suitable devices such as springs, hydraulic devices, etc.

Proceeding to refer to FIGS. 2 to 5, in the given embodiment, the safety device 10 is to be used in cooperation with the guide rope 20, and it may comprise a body 110, a first component 111 and a second component 112, which may be made of one or more suitable materials such as metallic materials and non-metallic materials as required.

According to different applicable situations, the body 110 is allowed to have any possible shape and construction and is not limited to the structure shown in the above drawings. The body 110 may be connected to the running device 30 by any feasible means such as connector (such as bolts, screws) connection, welded connection, rivet connection, etc. For example, one or more bolts may be used to install it onto the frame structure at the bottom of the elevator car.

The first component 111 and the second component 112 may be disposed on the body 110, and the passage 113 may be limited by them. When the running device 30 runs normally along the guide rope 20, the guide rope 20 will freely pass through the passage 113; that is, the internal gap distance of the passage 113 is greater than the radial distance of the guide rope 20 at this time, so that it will not interfere with the guide rope 20 passing through the passage. For example, in the optional embodiment shown in FIG. 4, the guide rope 20 adopts a rope material with a round cross-section at this time. When the running device 30 is in normal operation, since the bore diameter of the passage 113 is initially larger than the diameter of the guide rope 20, it can be ensured that the guide rope 20 freely pass through the passage 113 without being restricted by the first component 111 and the second component 112.

During the operation of the elevator system, due to various reasons, the running device 30 may be caused to run overspeed. At this time, it will be necessary to implement safety measures such as speed reduction restriction and stoppage on the running device 30. It should be understood that, in the prior art, it has provided many overspeed detection technologies for elevator cars, counterweights, etc. in elevator systems. These technologies have been understood and mastered by those skilled in the art and are not the key point of the present invention, so we will not go into much detail here.

Once it is detected that the running speed of the running device 30 exceeds the threshold (the specific value may be set according to different requirements), the guide rope 20 may be clamped in the passage 113 by the first component 111 and the second component 112, the thus resulted frictional resistance may restrict the further movement of the guide rope 20, thereby it may achieve the purpose of limiting the speed of the running device 30 (for example, reducing the running speed to below the above threshold or to a preset speed lower than that), or may also achieve the purpose of continuously decelerating the running device 30 until it stops.

Figure 2:
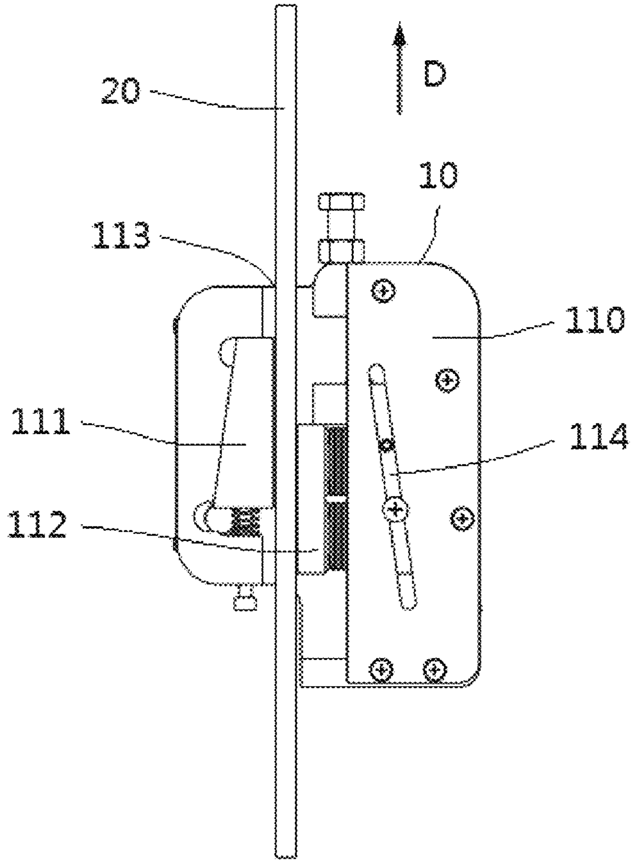
FIG. 2 is a structural schematic front view of an example of a safety device installed in the embodiment of the elevator system shown in FIG. 1, and the guide rope passing through the safety device is also shown in the figure.
Figure 3:
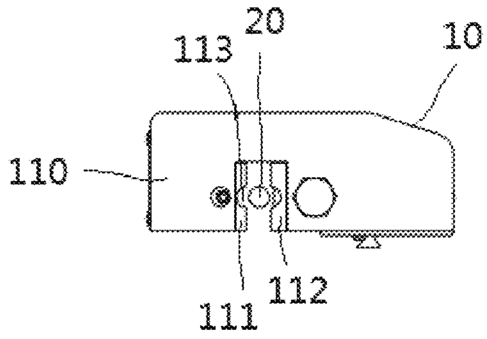
FIG. 3 is a structural schematic top view of the example of the safety device shown in FIG. 2, and the guide rope passing through the safety device is also shown in the figure.

In the example of FIG. 2, the first component 111 and the second component 112 are arranged opposite to each other on the body, and the passage 113 is defined and formed together by constructing a recess on their corresponding portions. Such first component 111 and the second component 112 have the feature of a wedge. As mentioned in the foregoing, during the normal running of the running device 30, the passage 113 will not cause any restriction to the guide rope 20 passing therethrough. However, when the running speed of the running device 30 exceeds a threshold, the internal gap distance of the passage 113 may be continuously reduced by generating a relative movement between the first and second components. As such, the first component 111 and the second component 112 will be in contact with the guide rope 20 and exert frictional resistance so that the further movement of the guide rope 20 can be restricted to achieve the effect of restricting the speed of the running device 30 or stopping the running device 30.

As an optional embodiment, in the example shown in FIG. 2, the first component 111 may be partially arranged at an upstream position of the second component 112 in the running direction D of the running device 30. In addition, based on considerations such as better and faster operation, both the first component 111 and the second component 112 may be arranged such that they have a common overlapping length in their running direction D, for example, the overlapping length may be arranged as being not less than half of the length of the second component 112, which is advantageous for quick response and immediately producing frictional resistance. In addition, it is also conceivable to set the movement of the second component 112 so that, after moving in the upstream direction of the first component 111 and when the running device 30 is stopped, the overlapping length between the second component 112 and the first component 111 is substantially equal to the length of the second component 112, which will help to clamp the guide rope 20 in the passage 113 more stably and reliably.

Figure 4:
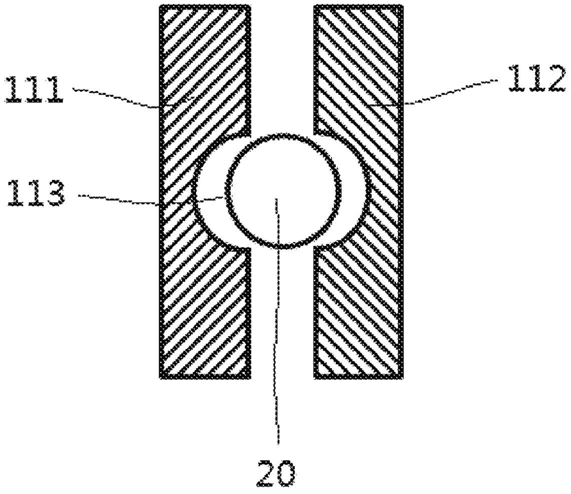
FIG. 4 is a structural schematic partial top view of the first component, the second component and the passage, and the guide rope in the example of the safety device shown in FIG. 2.
Figure 5:
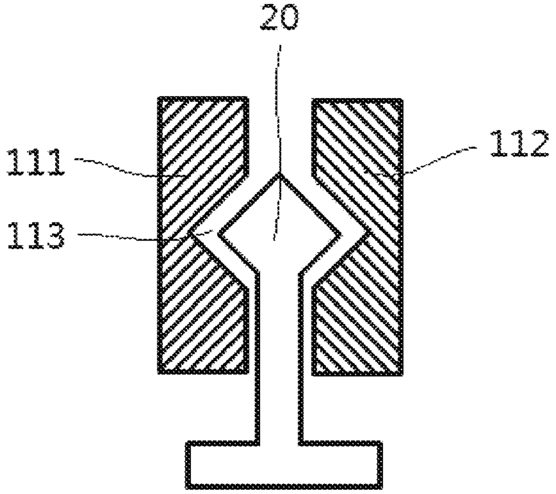
FIG. 5 is a structural schematic partial top view of the first component, the second component and the passage, and the guide rope in another example of the safety device according to the present invention.
Figure 6A:
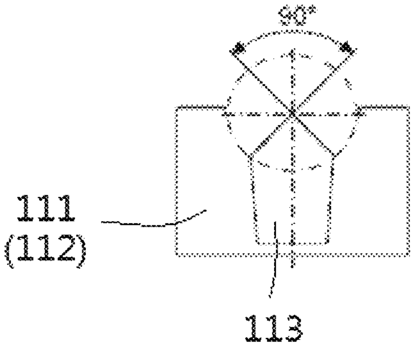
FIGS. 6(*a*)-6(*d*) are a structural schematic partial side view of several examples of the passage in the safety device according to the present invention.
Figure 6B:
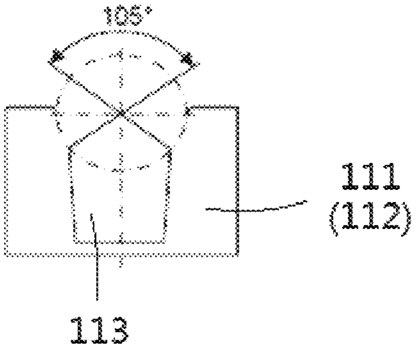
Figure 6C:
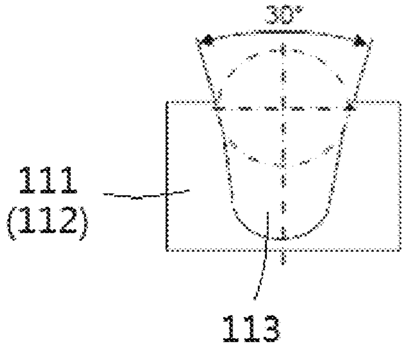
Figure 6D:
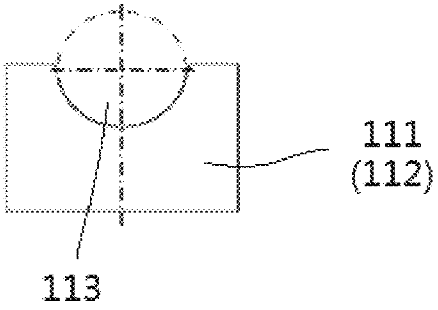

In some embodiments, for the corresponding portions of the passage 113 defined respectively by the first component 111 and the second component 112 in the safety device 10, they may be constructed to be structurally symmetrical to each other, as illustratively shown in FIGS. 4 and 5. However, it should be understood that it is not necessary to adopt a symmetrical arrangement. The present invention allows to adopt an asymmetrical arrangement in some applicable situations, as long as the first component 111 and the second component 112 can match and cooperate with the guide rope.

It should be understood that, according to the above teachings of the present invention, those skilled in the art may adopt a variety of structural constructions to achieve the safety device.

For example, FIG. 2 shows that a guide groove 114 may be provided on the body 110, and the guide groove 114 is set to be inclined relative to the running direction D. The specific inclination angle, groove width, etc. may be set according to application requirements. When it is found that the running speed of the running device 30 exceeds a threshold, the actuating component of the safety device 10 may be used to actuate the second component 112 to travel in the direction defined by the guide groove 114, so that a relative movement is occurred between the second component 112 and the first component 111, and further the goal of making the internal gap distance of the passage 113 continuously smaller as described above is achieved. In practical applications, the actuating component may take any possible form such as a push rod, a slider, or even a micro-motor, as long as the actuating component can form responding action to the corresponding input that the current running speed of the running device 30 exceeds the threshold has been detected in the elevator system so as to perform the above actuation operation to the second component that is connected to the actuating component.

In addition, it should also be understood that, in the foregoing example, it is illustratively describes that the second component 112 moves relative to the first component 111. In some embodiments, it may be changed into that the first component 111 moves relative to the second component 112, or both the second component 112 and the first component 111 move but a relative movement difference is formed therebetween. In addition, the movement trajectory of the first component 111 and/or the second component 112 may not be linear. For example, a rotational movement trajectory, a more complex combined movement trajectory (in which, for example, one part is a linear movement trajectory, the other part is a rotational movement trajectory or other form of trajectory), etc. are all possible, and these aspects are all allowed by the present invention.

It should be pointed out that, since the existing elevator system fails to provide a technical solution of the guide rope in the elevator system of the present invention, it is impossible for those skilled in the art to propose a safety device for matching and using with such guide rope. In particular, being different from traditional T-shaped rigid guide rails with flat contact surface structure, the guide rope in this elevator system may have non-planar profile such as circular arc profile (FIG. 4), diamond profile (FIG. 5), square profile, etc. Therefore, the corresponding portion of the first component 111 and/or the second component 112 in the safety device for defining the passage 113 may be configured to have a corresponding non-planar profile, for example, it may include but not limited to a circular arc profile (FIG. 4), diamond profile (FIG. 5), square profile, etc.

In addition, FIGS. 6(*a*)-6(*d*) also shows several embodiments by way of example FIG. 6(*d*) shows that the corresponding portion of the first component 111 (or the second component 112) used to form the passage 113 may be directly constructed into a semicircle shape. In FIGS. 6(*a*), 6(*b*) and 6(*c*), it shows that the above corresponding portion on the first component 111 (or the second component 112) may be constructed into having a non-planar profile with an undercut section, so as to be able to provide suitable friction force required by the practical applications in different environments. As an optional situation, the undercut angle range of the above undercut section may be set to 30°-105°. For example, the undercut angle may be set to 30°, 45°, 53°, 60°, 85°, 90°, 105° and so on. The specific undercut angle value may be flexibly set according to the requirements in use.

According to the technical solution of the present invention, an elevator system is also provided. One or more safety devices designed and provided according to the present invention may be configured in the elevator system as required. For example, one or more such safety devices may be installed at any suitable position on the running device of the elevator system, e.g., it may be installed at the bottom, top and/or side of the elevator car (or counterweight), so that it can be matched and used with the guide rope provided in the hoistway to safely control the running of the elevator. In this way, when the elevator system using the guide rope as the elevator guide rail of the present invention is used, various possible carried objects such as passengers, goods, pets, etc. can be transported to the corresponding destination very safely and reliably. Such an elevator system may be suitable for lifting and transporting device in high-rise, middle-rise or low-rise building places.

In specific implementation, the running device (such as the elevator car or counterweight) in the elevator system may be allowed to run in the vertical direction of the hoistway of the elevator system, or the running direction of the running device may be allowed to form a certain inclination angle (such as less than 15°, etc.) with the above vertical direction, which is allowed to be realized when the guide rope as mentioned above is used as the elevator guide rail.

The safety device for elevator system and elevator system according to the present invention have been elaborated above in detail by way of example only. These examples are merely used to illustrate the principle of embodiments of the invention, rather than limiting the present invention. Various modifications and improvements may be made by those skilled in the art without departing from the spirit and scope of the invention. Therefore, all equivalent technical solutions should fall within the scope of the present invention and be defined by the claims of the present invention.

What is claimed is:

1. A safety device for an elevator system, wherein the elevator system comprises a guide rope arranged in a hoistway to be used as a guide rail and a running device running along the guide rope, and the safety device comprises:

a body, which is connected to the running device; and a first component and a second component which are provided on the body and define a passage for the guide rope to pass through freely when the running device is in normal operation, the first and second components are configured for clamping the guide rope in the passage when a running speed of the running device exceeds a threshold, to restrict the speed of the running device or stop the running device;

wherein the first and second components are arranged opposite to each other to define the passage, and when the running speed of the running device exceeds the threshold, a relative movement between the first and second components occurs so that the internal gap distance of the passage becomes smaller, until the first and second components contact the guide rope and clamp it in the passage;

wherein both the first component and the second component are configured to move horizontally and vertically relative to the body;

wherein when the running speed of the running device exceeds the threshold, the second component moves upstream relative to the first component in the running direction of the running device, and when the running device stops, the overlapping length of the first and second components in the running direction is substantially equal to the length of the second component.

2. The safety device for the elevator system according to claim 1, wherein when the running device is in normal operation, the first component is partially arranged upstream of the second component in the running direction of the running device, and the first and second components have an overlapping length in the running direction, the overlapping length being not less than half of the length of the second component.

3. The safety device for the elevator system according to claim 1, wherein the corresponding portions of the first and second components defining the passage respectively, are configured to have structures symmetrical to each other.

4. The safety device for elevator system according to claim 1, wherein the top and bottom ends of the guide rope are connected to the top wall and the bottom pit of the hoistway through a first terminating device and a second terminating device respectively, at least one of the first and second terminating devices is configured to adjust the tension of the guide rope.

5. The safety device for the elevator system according to claim 1, wherein the running device is an elevator car and/or a counterweight, and/or the running direction of the running device is the vertical direction of the hoistway or the inclination angle of the running direction of the running device relative to the vertical direction is less than 15°.

6. The safety device for the elevator system according to claim 1, wherein the guide rope is a steel wire rope or a carbon fiber rope, and/or the diameter of the guide rope is in the range of 10 mm-30 mm.

7. An elevator system, comprising:

a hoistway;

a guide rope, which is arranged in the hoistway to be used as a guide rail;

a running device, which is arranged in the hoistway and runs along the guide rope; and at least one safety device for the elevator system according to claim 1, which is arranged to be connected to the running device.

8. A safety device for an elevator system, wherein the elevator system comprises a guide rope arranged in a hoistway to be used as a guide rail and a running device running along the guide rope, and the safety device comprises:

a body, which is connected to the running device; and a first component and a second component which are provided on the body and define a passage for the guide rope to pass through freely when the running device is in normal operation, the first and second components are configured for clamping the guide rope in the passage when a running speed of the running device exceeds a threshold, to restrict the speed of the running device or stop the running device;

wherein the first and second components are arranged opposite to each other to define the passage, and when the running speed of the running device exceeds the threshold, a relative movement between the first and second components occurs so that the internal gap distance of the passage becomes smaller, until the first and second components contact the guide rope and clamp it in the passage;

wherein both the first component and the second component are configured to move horizontally and vertically relative to the body;

wherein the body is provided with a guide groove inclined with respect to the running direction, and the safety device comprises an actuating component which is connected to the second component and actuates the second component to travel along the guide groove to generate the relative movement with the first component when the running speed of the running device exceeds the threshold.

9. A safety device for an elevator system, wherein the elevator system comprises a guide rope arranged in a hoistway to be used as a guide rail and a running device running along the guide rope, and the safety device comprises:

a body, which is connected to the running device; and a first component and a second component which are provided on the body and define a passage for the guide rope to pass through freely when the running device is in normal operation, the first and second components are configured for clamping the guide rope in the passage when a running speed of the running device exceeds a threshold, to restrict the speed of the running device or stop the running device;

wherein the first and second components are arranged opposite to each other to define the passage, and when the running speed of the running device exceeds the threshold, a relative movement between the first and second components occurs so that the internal gap distance of the passage becomes smaller, until the first and second components contact the guide rope and clamp it in the passage;

wherein both the first component and the second component are configured to move horizontally and vertically relative to the body;

wherein the corresponding portions of the first component and/or the second component defining the passage are configured to have a non-planar profile.

10. The safety device for the elevator system according to claim 9, wherein the non-planar profile includes a circular arc profile, a diamond profile or a square profile, and/or the non-planar profile has an undercut section with an undercut angle range of 30°-105°.

11. The safety device for the elevator system according to claim 9, wherein the non-planar profile includes a diamond profile, a square profile, or the non-planar profile has an undercut section with an undercut angle range of 30°-105°.

* * * * *